(12) United States Patent
Watanabe et al.

(10) Patent No.: US 6,707,133 B2
(45) Date of Patent: Mar. 16, 2004

(54) SEMICONDUCTOR CHIP HAVING AN ARRAYED WAVEGUIDE GRATING AND MODULE CONTAINING THE SEMICONDUCTOR CHIP

(75) Inventors: Shinya Watanabe, Tokyo (JP); Hiroyuki Katou, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/067,320

(22) Filed: Feb. 7, 2002

(65) Prior Publication Data

US 2002/0113242 A1 Aug. 22, 2002

(30) Foreign Application Priority Data

Feb. 22, 2001 (JP) ........................................ 2001-046663

(51) Int. Cl.[7] .............................................. H01L 23/544
(52) U.S. Cl. ...................... 257/620; 257/622; 438/110; 438/113; 438/458; 438/460; 438/462; 438/997
(58) Field of Search ................................ 257/620, 622; 438/110, 113, 458, 460, 462, 997

(56) References Cited

U.S. PATENT DOCUMENTS

| | | | | |
|---|---|---|---|---|
| 5,223,741 A | * | 6/1993 | Bechtel et al. ............ 257/678 |
| 5,327,517 A | * | 7/1994 | Yamada et al. ............ 385/137 |
| 5,341,024 A | * | 8/1994 | Rosotker .................... 257/620 |
| 5,661,316 A | * | 8/1997 | Kish, Jr. et al. ........... 257/190 |
| 5,777,386 A | * | 7/1998 | Higashi et al. ............ 257/737 |
| 6,021,267 A | * | 2/2000 | Bonn et al. ............ 395/500.22 |
| 6,513,564 B2 | * | 2/2003 | Bryan et al. ................ 156/584 |
| 6,528,864 B1 | * | 3/2003 | Arai ............................ 257/620 |
| 6,529,670 B1 | * | 3/2003 | Saito et al. ................ 385/137 |

* cited by examiner

Primary Examiner—David Nelms
Assistant Examiner—Andy Huynh
(74) Attorney, Agent, or Firm—Sughrue Mion, PLLC (57) ABSTRACT

On a wafer, patterns of arrayed waveguide gratings are formed. Each arrayed waveguide grating has an arcuate shape obtained by arranging two curved-line portions convexed in the same direction at a predetermined spacing and connecting respective end portions thereof with two mutually parallel straight lines. These arrayed waveguide gratings are cut out along straight cutting paths and curved cutting paths in which two arcuate portions of the same shape are arranged side by side in a lateral direction. Thus, a larger number of chips can be produced as compared with a case where each array waveguide grating is cut out in a rectangular shape. Ultrasonic machining techniques or sandblast machining techniques are suitable for the cutting operation.

34 Claims, 10 Drawing Sheets

SEMICONDUCTOR CHIP HAVING AN ARRAYED WAVEGUIDE GRATING AND MODULE CONTAINING THE SEMICONDUCTOR CHIP

BACKGROUND OF THE INVENTION

1. Field of the Invention

The present invention relates to a semiconductor chip obtained by cutting, from a wafer, an element occupying a non-rectangular area. The present invention also relates to a module containing an element occupying a nonrectangular area. For example, the present invention relates to a chip and a manufacturing method thereof such as an arrayed waveguide grating chip, a manufacturing method thereof, and manufacturing a module containing an arrayed waveguide grating chip.

2. Description of the Related Art

As the volume of data to be transmitted increases, there is a corresponding demand for a larger transmission capacity in an optical fiber communications system. In addition, optical wavelength filtering is becoming increasingly important as an optical multiplexing/demultiplexing device for multiplexing and/or demultiplexing different wavelengths in Dense Wavelength Division Multiplexing (DWDM) systems. There are various types of optical wavelength filters. Among these, an arrayed waveguide grating has the desired wavelength characteristics such that a high extinction ratio is obtained in a narrow band region, and also features a filter device having multiple inputs and outputs. An arrayed waveguide grating is capable of multiplexing or demultiplexing signals, allowing a wavelength multiplexing/demultiplexing device can be easily constructed. Further, when the arrayed waveguide grating is constructed with quartz waveguides, the arrayed waveguide grating couples well with optical fibers and operates at small insertion loss, i.e., on the order of several dB (decibels). Due to these advantages, the arrayed waveguide grating is gaining recognition as a particularly important device among the optical wavelength filters.

Figure 1:
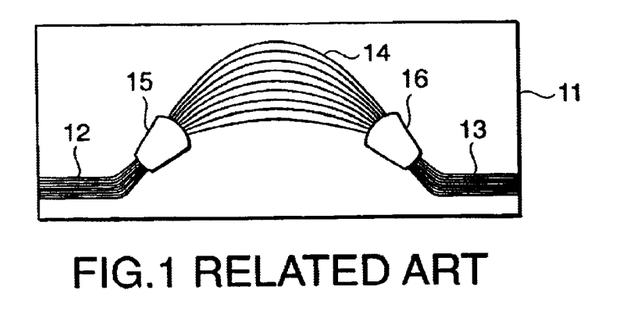
FIG. 1 is a plan view showing an overall structure of a related arrayed waveguide grating.
Figure 2:
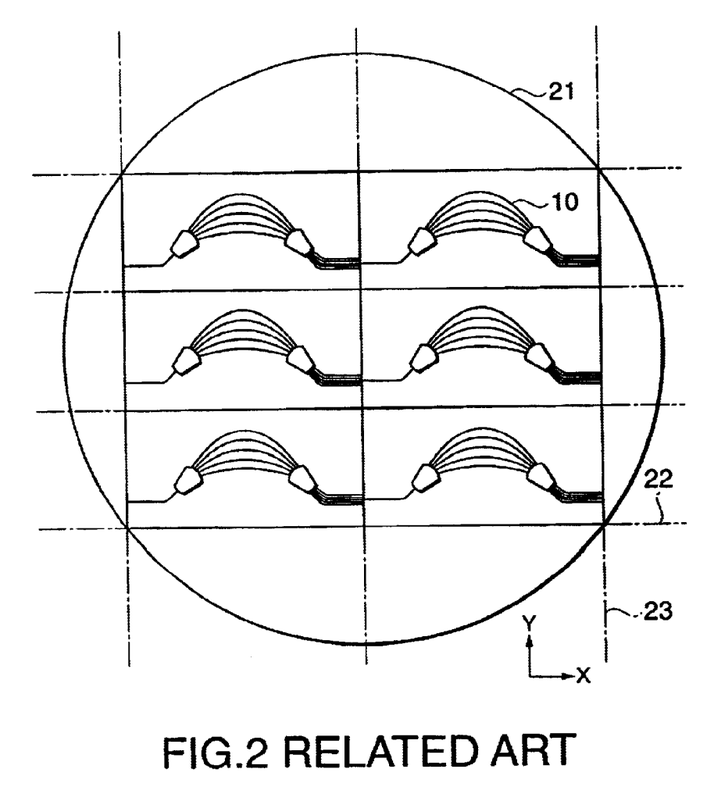
FIG. 2 is plan view of arrayed waveguide gratings laid out on a wafer in a related manner.

FIG. 1 shows an overall structure of a related arrayed waveguide grating. An arrayed waveguide grating comprises one or plural input waveguides 12 formed on a substrate 11, a plurality of output waveguides 13, a channel waveguide array 14 wherein the respective arrayed waveguides are curved in a certain direction, each waveguide having a different curvatures. The arrayed waveguide grating further comprises an input side slab waveguide 15 for connecting the input waveguides 12 with the channel waveguide array 14, and an output side slab waveguide 16 for connecting the channel waveguide array 14 with the output waveguides 13. Multiplexed optical signals entering from the input waveguides 12 have their propagation paths expanded at the input side slab waveguide 15 before entering the channel waveguide array 14. In the channel waveguide array 14, the individual arrayed waveguides comprising the channel waveguide array 14 have mutually different optical path lengths. The individual arrayed waveguides are configured to progressively become either longer or shorter. Therefore, light propagating through the individual arrayed waveguides of the channel waveguide array 14 are imparted with predetermined phase differences before reaching the output side slab waveguide 16. As a result, light is focused (condensed) at mutually different positions on the interface of the output side slab waveguide 16 and the output waveguides 13 depending on wavelength. Since the output waveguides 13 are arranged at positions corresponding to different wavelengths, any given wavelength component can be taken from one of the output waveguides 13. Referring to FIG. 2, arrayed waveguide gratings 10 are commonly formed on a wafer comprising a silicon base or a quartz base. The wafer has a substantially disk-like shape, on which a plurality of the arrayed waveguide gratings 10 are formed and subsequently cut out into individual chips. For the cutting operation, it has been customary to use a technique called dicing, in which a saw blade is used to scan along predetermined cutting tracks. FIG. 2 shows how arrayed waveguide gratings 10 are laid out on a wafer for related cutting operations. In FIG. 2, the arrayed waveguide gratings 10 are cut along the cutting paths 22 and 23, respectively scribed in the X-axis and Y-axis directions at predetermined intervals, into individual chips, each having a rectangular shape.

As described above, it has been common cut a wafer using the cutting paths 22 and 23 to obtain individual chips of a rectangular shape. Cutting out individual rectangular shaped chips this way is efficient for ordinary integrated circuits, since the integrated circuit itself is formed into a rectangular shape.

Figure 3:
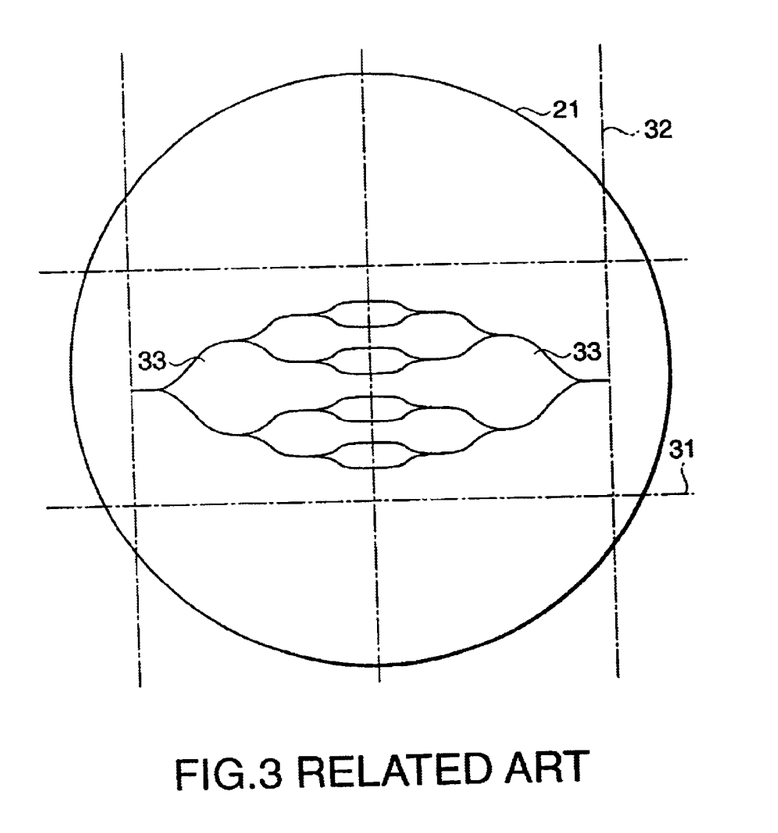
FIG. 3 is an plan view showing how 1×N splitters are laid out on a wafer in a related manner.

The arrayed waveguide gratings shown in FIG. 1 are formed in an arcuate or a boomerang-like shape. Consequently, when arrayed waveguide gratings are cut out as rectangular chips as in the related art, wafer utilization efficiency is low since there is wasted space. Referring to FIG. 2, when a wafer 21 having a diameter of about 13 cm is used, only about 4 to 6 chips of the arrayed waveguide gratings can be obtained from one wafer 21. Thus, the arrayed waveguide gratings occupy a small area relative to the entire area of a wafer. FIG. 3 shows an example of 1×N splitters as another layout on a wafer. In this example, 1×N splitter chips 33 are cut out from a wafer 21 by using cutting paths 31 and 32. Although a 1×N splitter itself in this example is formed in a funnel shape obtained by dividing a rhombus in half, this is cut out in a rectangular shape, whereby only two chips 33 are cut out from one wafer 21. Thus, there is a similar problem low wafer utilization efficiency.

SUMMARY OF THE INVENTION

In view of the above, it is therefore an aspect of the present invention to provide a method of cutting a chip from a wafer such that a greater number of chips can be obtained from one wafer. In an exemplary embodiment, arrayed waveguide gratings having a non-rectangular area as a whole are provided on a wafer and cut therefrom, and a module containing an arrayed waveguide grating is manufactured.

To solve the above problem, a chip of the present invention is obtained by cutting it from a wafer along its contour of a concave shape recessed in one direction. An arrayed waveguide grating is provided on the chip, and the shape of the chip is determined on the basis of the shape of the arrayed waveguide grating. The chip comprises reinforcement means mounted on at least a portion of the chip so as to reinforce the chip. It is preferable that the reinforcement means are mounted on a narrow part of the chip. The reinforcement means is preferably a copper plate having a shape identical to the chip. The reinforcement means may be a rectangular copper plate formed with such a size as to entirely surround the chip. Moreover, a chip of the present invention comprises a first chip obtained by cutting it from a first wafer along its contour of a concave shape recessed in one direction, a second chip obtained by cutting it from a second wafer along a contour that is identical to the contour of the first chip and combining means for combining the first chip with the second chip. The combining means can be an adhesive.

A wafer of the present invention includes a plurality of chips obtained by cutting along the contour of a concave shape recessed in one direction. The concave shapes of adjacent chips are at least partially overlapped with each other. The plurality of chips have the same shape. The shape is an arcuate shape having two curved-line portions convexed in the same direction. The chips are arranged at a predetermined spacing and respective end portions thereof are connected to two mutually parallel straight lines. Alternatively, the shape is a funnel shape obtained by dividing in half a rhombus in which two curved-line portions are convexed in a direction moving away from each other. The chips are arranged at a predetermined spacing and the respective end portions thereof are connected to two mutually parallel straight lines.

Another aspect of the present invention provides a module comprising a chip cut from a wafer along a contour of a concave shape that is recessed in one direction, a box comprised of an upper casing and a lower casing for accommodating the chip, and buffer agents provided in the box. The module further comprises a temperature detecting means that detects the temperature inside the casing and controlling it. Moreover, the module comprises a support body mounted on the chip for supporting the chip and a spring part provided in the box for mounting the support body. The support body is preferably a metal plate.

Another aspect of the present invention provides a chip manufacturing method, wherein the method forms, on the same wafer, a plurality of elements that are bounded by their respective contours. The contours of the elements comprise a concave shape recessed in one direction. The elements are cut from the wafer to obtain chips comprising an individual element.

A laser beam is used to cut the wafer along the contours to obtain individual element chips. The cutting step may use an ultrasonic vibration tool adapted to match the shape of the contours of the respective elements. The cutting out step may use hydraulic pressure to obtain the chips having an individual element. Dicing is used to cut the straight-line portions of the chip contours. The chip manufacturing method further comprises mounting a plate on at least a part of the chip for reinforcing the chip. Moreover, the chip manufacturing method cuts out a first chip from a first wafer along the contour of its concave shape recessed in one direction, and cuts out a second chip from a second wafer having the same shape as that of the first chip and bonding together the first and second chips. The bonding step bonds together the first and second chips using an adhesive.

According to the present invention, the number of chips that can be obtained from one wafer is increased because individual chips are formed in a concave shape wherein unnecessary portions are removed.

BRIEF DESCRIPTION OF THE DRAWINGS

These and other aspects, features and advantages of the invention will become more fully apparent from the following detailed description taken in conjunction with accompanying drawings.

DETAILED DESCRIPTION OF THE PRESENT INVENTION

Hereinafter, the present invention will be described in detail with reference to the drawings.

Figure 4:
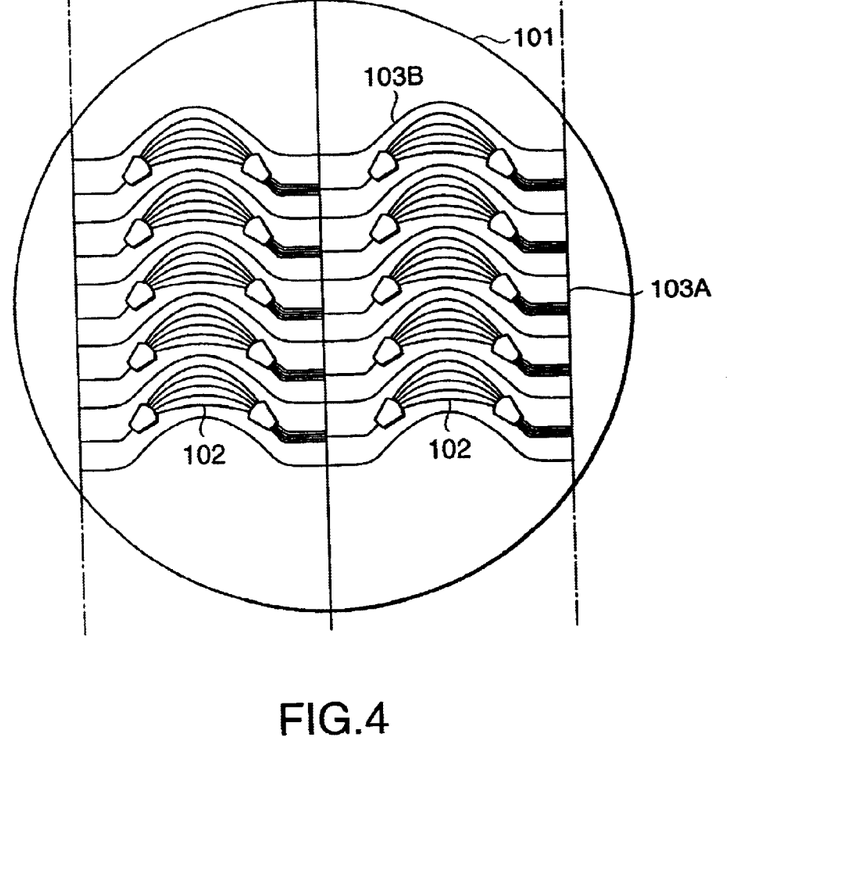
FIG. 4 is a plan view showing patterns of arrayed waveguide grating chips formed on a wafer according to a first embodiment of the present invention.

FIG. 4 shows arrayed waveguide grating elements formed on a wafer according to the present invention. In FIG. 4, each arrayed waveguide grating 102 has a shape similar to the shape shown in FIG. 1. Five arrayed waveguide gratings 102 are formed in one row. Thus, ten arrayed waveguide gratings 102 are formed in total. In each arrayed waveguide grating 102, the portion corresponding to the channel waveguide array 14 (shown in FIG. 1) is curved into an arcuate shape. Cutting paths 103A and 103B for cutting out an individual arrayed waveguide grating chip are scribed so as to surround each of the arcuate or typical boomerang-shaped portions of the arrayed waveguide gratings 102. The cutting paths 103 comprise straight cutting paths 103A and curved cutting paths 103B. For the cutting paths 103B, two arcuate portions of the same shape are arranged side by side in a lateral direction. Two arrayed waveguide gratings 102 that are vertically adjacent to each other share a common curved cutting path 103B. That is, in contrast to the arrangement of arrayed waveguide gratings shown in FIG. 2, the arrayed waveguide gratings 102 shown in FIG. 3 are aligned in a vertically superimposed relationship, wherein adjacent patterns share a common curved-line portion (cutting path 103B). Accordingly, the number of the arrayed waveguide grating chips that can be cut out from one wafer 101 is considerably increased.

Note that, while cutting along the cutting paths 103A can be carried out by dicing (since they are straight lines), dicing cannot be performed on the curved cutting paths 103B. Accordingly, in order to cut the wafer 101 shown in FIG. 4, it is necessary to: (a) cut along the straight-line portions and curved-line portions by using a technique that allows cutting along a curved line; or (b) use the technique for cutting along a curved line and dicing in combination. The following techniques exist for cutting a wafer along a curved line:
(1) Supersonic machining using a horn;
(2) Laser beam machining;
(3) Hydraulic machining; and
(4) Sandblast machining.

Among the above, the supersonic machining, laser beam machining and hydraulic machining are well-known techniques. However, when using laser beam machining and hydraulic machining, it is necessary to trace of all the cutting paths. Thus, these techniques are unsuitable for mass production processes when the time required for the cutting operations is considered. For mass production, it is preferable to use ultrasonic machining with a horn and sandblast machining for the cutting operations. Note that sandblast machining is a technique that is widely used for surface treatment. Sandblast machining has been used to perform surface treatment or removal of burrs from materials other than wafers, such as glass. Particles are blasted over the entire wafer, while areas of the wafer (other than those of cut out portions) are protected by coating a resin material or the like. This makes it possible to cut the wafer not only along a straight line but also along a curved line.

Figure 5:
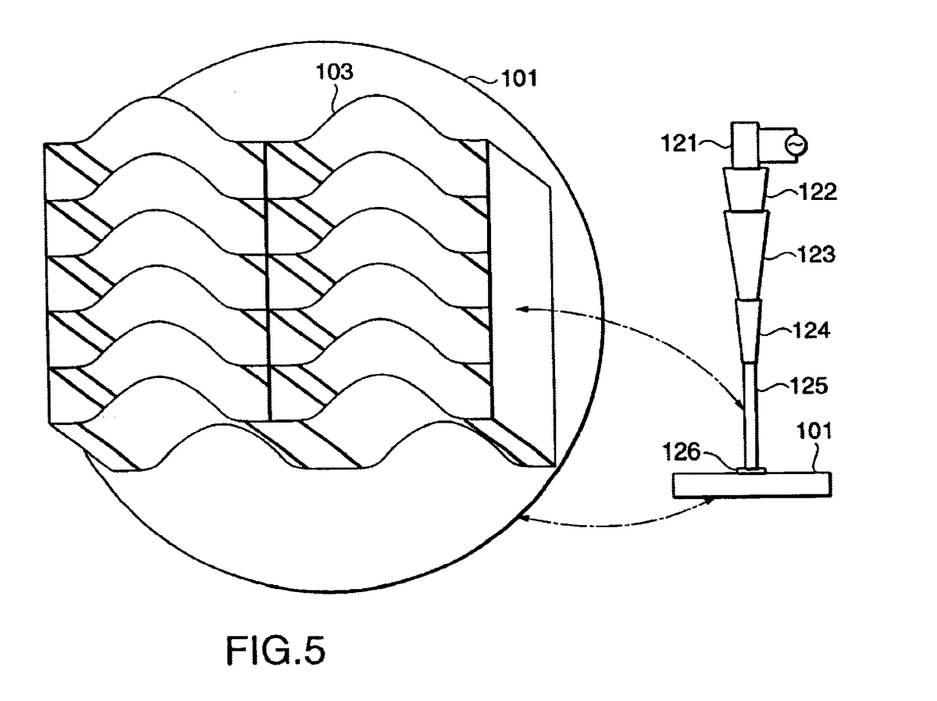
FIG. 5 illustrates wafer cutting operations using an ultrasonic machining technique.

The ultrasonic machining technique cuts a wafer by vibrating a tool by means of ultrasonic waves transmitted via a resonant medium called a horn. FIG. 5 shows the principle of cutting a wafer using ultrasonic machining. An ultrasonic oscillator 121 is driven by alternating current to cause an ultrasonic vibrator 122 to vibrate and thereby generate ultrasonic waves. The ultrasonic waves are transmitted via a cone 123 and a horn 124 to vibrate a tool 125 in a vertical direction. A processing liquid 126, obtained by mixing abrasive grains in water, is supplied in a space between the tool 125 and the wafer 101 that is to be machined. At this point, when the tool 125 is being pressed against the wafer 101 by applying appropriate pressure and ultrasonic vibration is generated, the wafer 101 is cut into a desired shape due to the impact of the abrasive grains exerted thereon. Although the amount of machining achieved by each impact is very small, since there are thousands of impacts per second, it is possible to perform cutting along all the paths on the wafer 101 all at once by setting the tip of the tool 125 at a position to coincide with the cutting path 103 of the wafer 101. Therefore, machining with high precision can be efficiently and quickly performed. Needless to say, it is also possible to separate the cutting path 103 shown in FIG. 5 into a plurality of sub-cutting paths of the same shape in advance, and to move the wafer 101 or the tool 125 along each of the separated sub-cutting paths so that cutting is effected with respect to the each sub-cutting path by using the ultrasonic machining technique.

The chip manufacturing process may include a step of inspecting the characteristics of arrayed waveguide gratings on the individual chips obtained by cutting operations on the wafer 101. If the end-faces of the individual arrayed waveguides corresponding to the straight cutting paths do not form somewhat fine mirror-finished surfaces at this stage, it is difficult to conduct an optical inspection that uses the end parts of input and output optical waveguides existing in these portions. Accordingly, when the precision of ultrasonic machining is inadequate for carrying out such an inspection, it is effective to cut only those portions of the wafer corresponding to the cutting paths 103A by dicing so that a condition suitable for carrying out such inspection can be attained without especially polishing the end-faces of the arrayed waveguide gratings.

Figure 6:
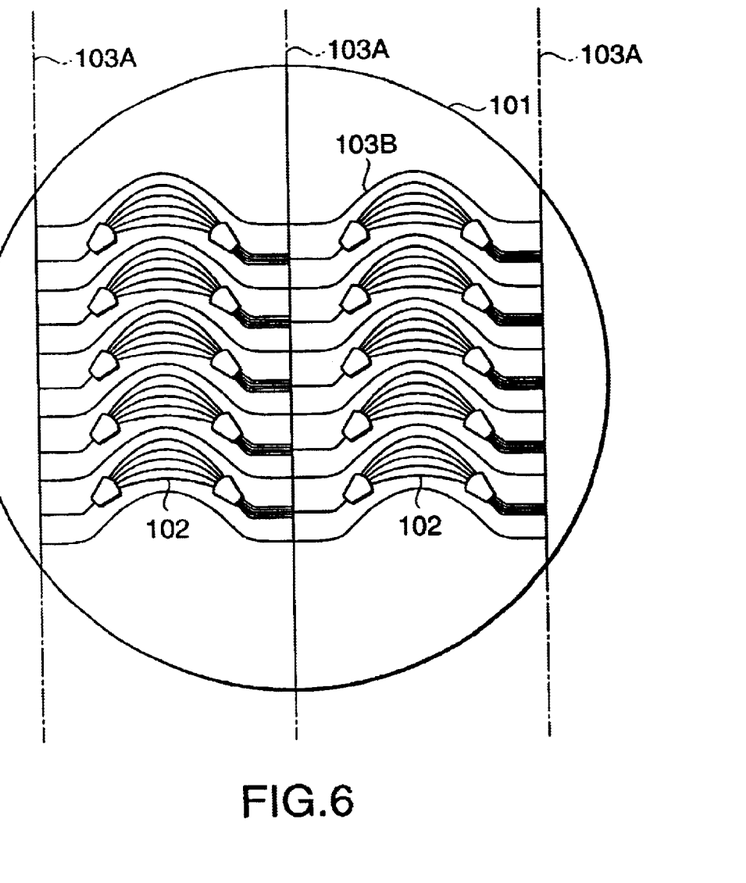
FIG. 6 illustrates two different cutting methods of a wafer.

FIG. 6 is used to explain how two different machining methods are used depending on which portions of the wafer are being cut. First, ultrasonic machining is performed along the curved cutting paths 103B. Next, dicing is successively performed along the straight cutting paths 103A, so that each arrayed waveguide grating 102 is cut from the wafer 101. Therefore, the optical characteristic test can be conducted without polishing the cut surfaces along the plane of the cutting paths 103A. Note that it is also possible to cut along the cutting paths 103A first. In that case, the optical characteristic test can be conducted with respect to each arrayed waveguide grating 102 prior to cutting along the curved cutting paths 103B.

Figure 7:
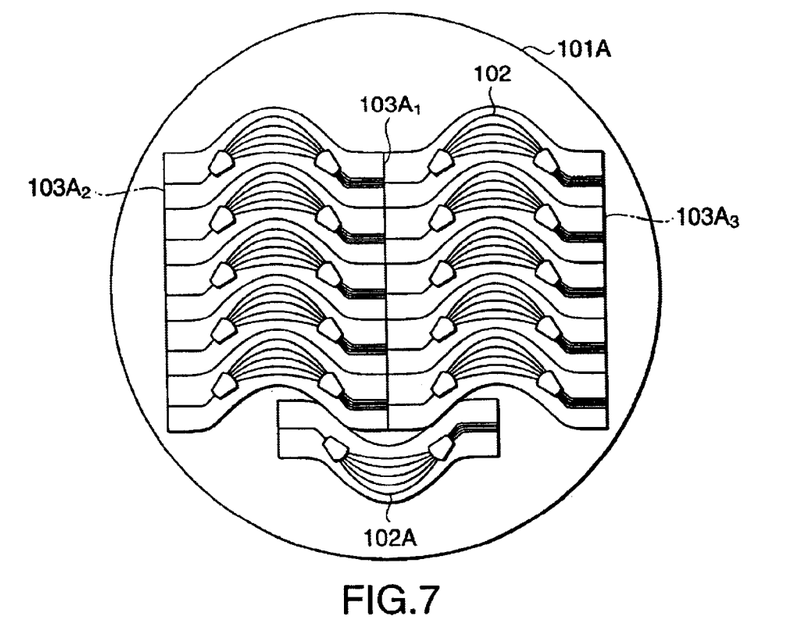
FIG. 7 illustrates two different cutting methods of a wafer.

FIG. 7 illustrates another layout example of arrayed waveguide gratings provided on a wafer. According to FIG. 7, on the wafer 101A, besides the ten arrayed waveguide gratings 102 shown in FIG. 1, an inverted arrayed waveguide gratings 102A is added. Thus, eleven arrayed waveguide gratings in total can be cut from the wafer 101A. In order to cut the arrayed waveguide gratings from the wafer 101A, the lower end portion of the straight cutting path 103 A₁ that is formed at the center must be terminated before reaching the pattern 102A. Therefore, in the case of the wafer 101A shown in FIG. 7, dicing may be applied to the straight cutting paths 103A₂ and 103A₃ arranged in the peripheral portions. It is preferable, however, to use another cutting method with respect to the other cutting paths, such as ultrasonic machining. It is possible, of course, to cut along all of the cutting paths shown in FIG. 7 with ultrasonic machining or with sandblast machining.

As described above, the patterns of elements which are nonrectangular in shape as a whole, such as arrayed waveguide gratings, are efficiently laid out on a wafer, and then they are cut out in a given shape that is in conformity with the shape of each pattern. Therefore, a larger number of chips can be manufactured. However, as compared with a rectangular chip, the chips cut out in this way may generally include a narrow-width region or a portion of weak mechanical strength, such as a small projecting portion. In the case of the arrayed waveguide grating, it has an arcuate or boomerang shape. Thus, mechanical strength may deteriorate in portions having a reduced width compared with related rectangular chips. The thickness of a chip, which largely affects its mechanical strength, is dependent upon the thickness of a silicon wafer or quartz glass as its main components. The thickness of an arrayed waveguide grating chip is generally 1 mm or less, which gives rather poor resistance against impact and vibration. It is necessary to ensure that an arrayed waveguide grating chip or an apparatus incorporating an arrayed waveguide grating chip is capable of fully withstanding any impacts that may be applied thereto. In order to provide an arrayed waveguide grating chip (hereinafter abbreviated as an arrayed waveguide grating unless otherwise indicated) having excellent resistance against impact and vibration, it is necessary to: (i) improving the mechanical strength of the arrayed waveguide grating chip itself; or (ii) provide a structure in which stresses are less likely to be imposed on the arrayed waveguide grating chip.

For improving the mechanical strength of the arrayed waveguide grating chip itself, the following may be effective:
(a) Large copper plate: a copper plate that holds an arrayed waveguide grating for heat dissipation is enlarged in size.

(b) Reinforcement beam: a reinforcement beam is attached to an arrayed waveguide grating to enhance its mechanical strength.
(c) Two-layer substrate structure: a silicon substrate having the same shape as the arrayed waveguide grating is prepared and attached to the arrayed waveguide grating, thereby increasing the overall thickness.

As for providing a structure in which stresses are less likely to be applied on the chip, the following may be effective.

(d) Buffer filling type: buffer agents (heat insulating material) are filled within a package for accommodating an arrayed waveguide grating.
(e) Supporting by spring type: edge portions of an arrayed waveguide grating are fixed by means of spring members to thereby absorb impact applied thereon.

Figure 8:
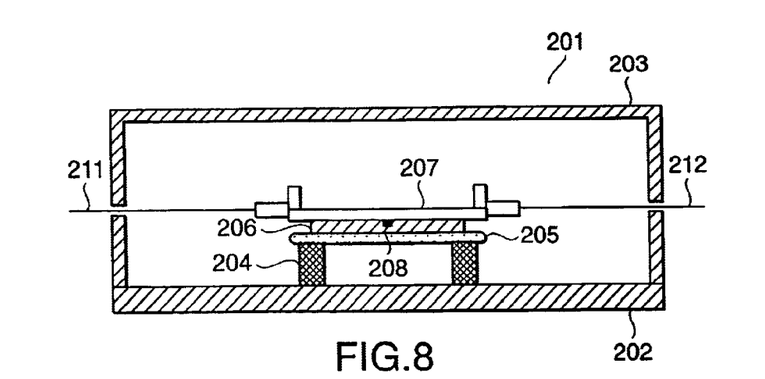
FIG. 8 is a cross-sectional view showing an interior of an arrayed waveguide grating package.

By employing an enlarged heat dissipation copper plate for holding an arrayed waveguide grating, resistance of a wafer against impact or vibration is enhanced. FIG. 8 shows an interior of a package for accommodating an arrayed waveguide grating. An arrayed waveguide grating package 201 comprises a hollow box-like case comprised of a case bottom plate portion 202 and a case cover 203. In the case bottom plate portion 202, a tabular heater 205 is disposed in parallel to the case bottom plate portion 202 through heat insulating columns 204. A large copper plate 206 is placed on the heater 205, and an arrayed waveguide grating 207 is mounted on the large copper plate 206. Although not shown, a groove is etched in the surface of the large copper plate 206 opposing the arrayed waveguide grating 207, which extends from a peripheral portion of the surface to a central portion thereof. A temperature detecting element 208 is embedded in the portion of the groove corresponding to the portion of the channel waveguide array 14 of the arrayed waveguide grating 207. A lead wire of the temperature detecting element 208 is embedded in the other portion of the groove. The temperature detecting element 208 detects the temperature of the heater 205 and adjusts the temperature of the arrayed waveguide grating 207 to a desired temperature. Optical fibers 211 and 212 are introduced into the arrayed waveguide grating package 201. Each of the optical fibers 211 and 212 is connected to an external apparatus (not shown). The optical fiber 211 is fixed to an edge portion of the arrayed waveguide grating 207 by an ultraviolet curing adhesive. The optical fiber 212 is fixed to a fiber array (not shown) of the arrayed waveguide grating 207.

Figure 9:
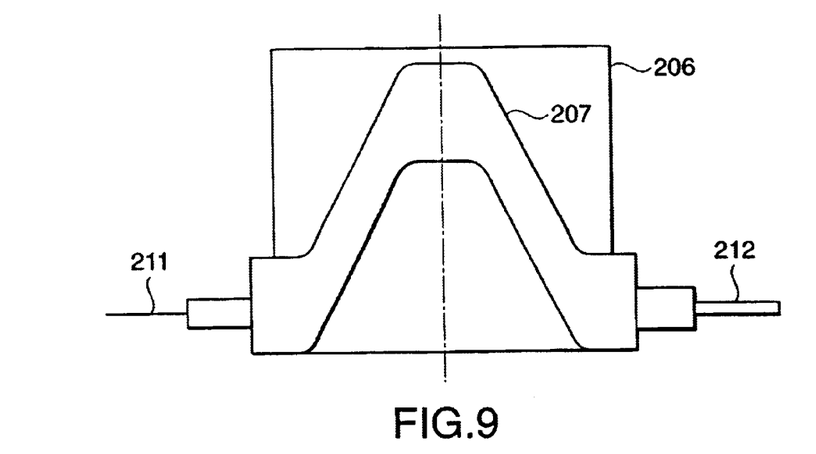
FIG. 9 is a plan view showing an arrayed waveguide grating mounted on a large copper plate.
Figure 10:
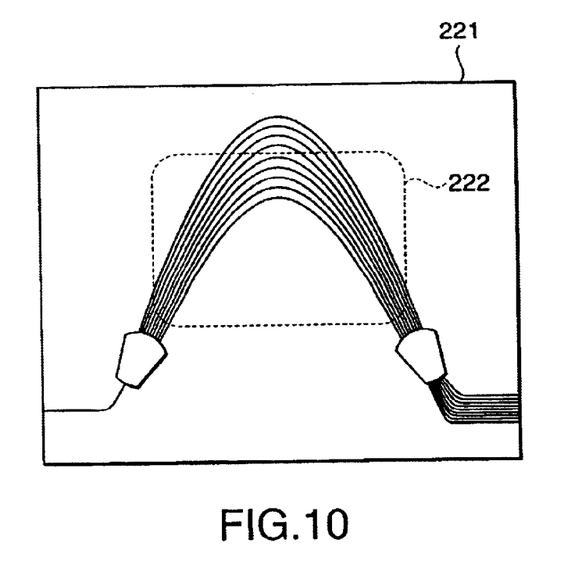
FIG. 10 is a plan view showing an arrayed waveguide grating and a copper plate employed in a related arrayed waveguide grating package.
Figures 11, 12:
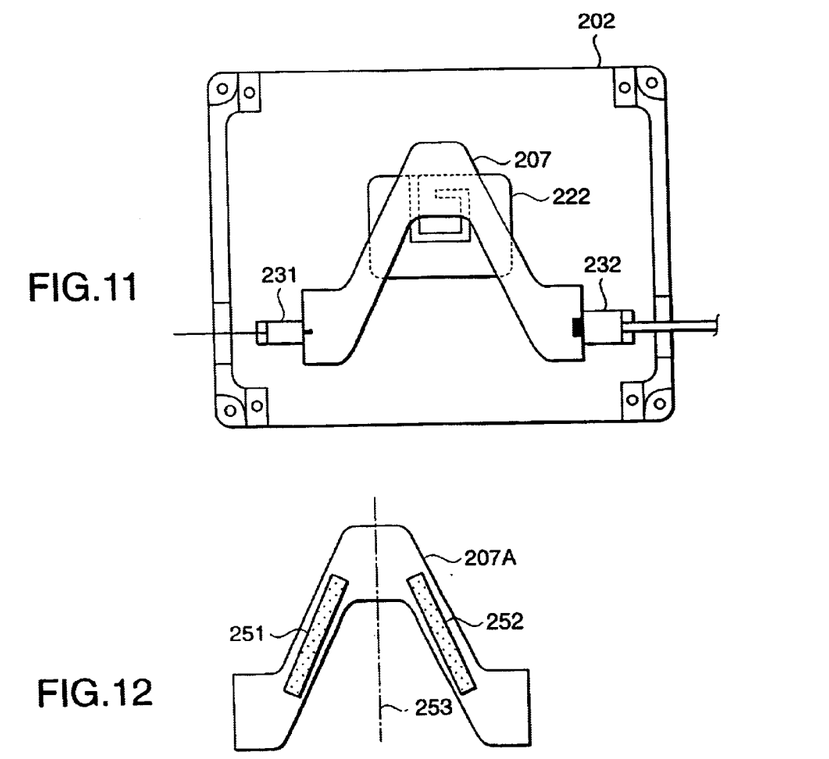
FIG. 11 is a plan view showing an arrayed waveguide grating having an arcuate profile mounted to a related copper plate.
FIG. 12 is plan view showing an arrayed waveguide grating having reinforcement beams.

FIG. 9 shows an arrayed waveguide grating 207 according to the present embodiment mounted on the large copper plate 206, as seen from the above within the package. Preferably, the large copper plate 206 is tough pitch copper as defined by C 1100 of the JIS standards is used as a copper material having excellent workability. The large copper plate 206 has a rectangular shape of 6×4 cm substantially surrounding the arrayed waveguide grating 207, and is formed with a thickness of several millimeters. The arrayed waveguide grating 207 is mounted to the large copper plate 206. Copper materials other than tough pitch copper may also be used. By way of reference, FIG. 10 shows an example of an arrayed waveguide grating and a copper plate employed in a related arrayed waveguide grating package. A rectangular area indicated by a dashed line within a rectangular shaped array waveguide chip 221 is the area occupied by a copper plate 222. The large copper plate 206 shown in FIG. 9 is larger in size than the copper plate 222 shown in FIG. 10. Consequently, the weak mechanical strength of the peripheral portion of the arrayed waveguide grating 207 is enhanced. By way of reference, FIG. 11 shows an arrayed waveguide grating having an arcuate profile in accordance with the present invention mounted to a related copper plate. Here, there is assumed a model structure in which loads equivalent to those of fiber arrays 231 and 232 are applied onto the free ends of a cantilever beam of 6 mm in width, 0.83 mm in thickness, and 27 mm in length. According to the model structure, a cantilever beam capable of withstanding impact of 500 G must be backed with three or more silicon substrates having the same thickness and configuration as those of the arrayed waveguide grating. Although a large rectangular copper plate is used, a copper plate having the same configuration as the arrayed waveguide grating 207 can also be used by bonding it onto the arrayed waveguide grating 207.

Alternatively, using a reinforcement beam provides excellent resistance against impact and vibration. FIG. 12 shows an example of an arrayed waveguide grating using reinforcement beams. In an arrayed waveguide grating 207A, reinforcement beams 251 and 252 are respectively attached to a rise portion and a fall portion of the arcuate shape. The reinforcement beams 251 and 252 are symmetrical with respect to the center axis 253 of the arrayed waveguide grating 207A.

Figure 13:
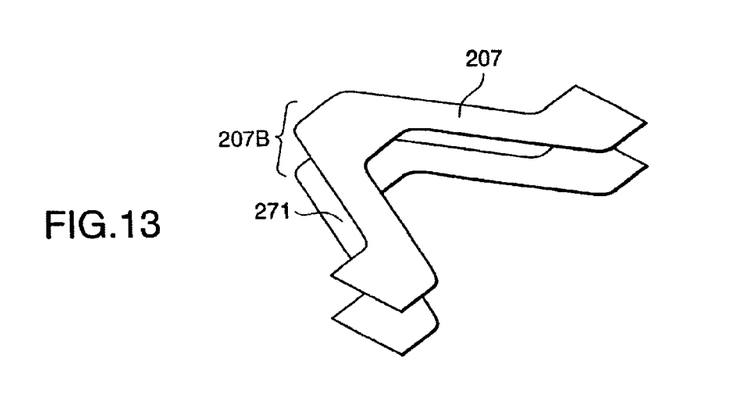
FIG. 13 is plan view showing an arrayed waveguide grating having a two-layer substrate structure.
Figure 14:
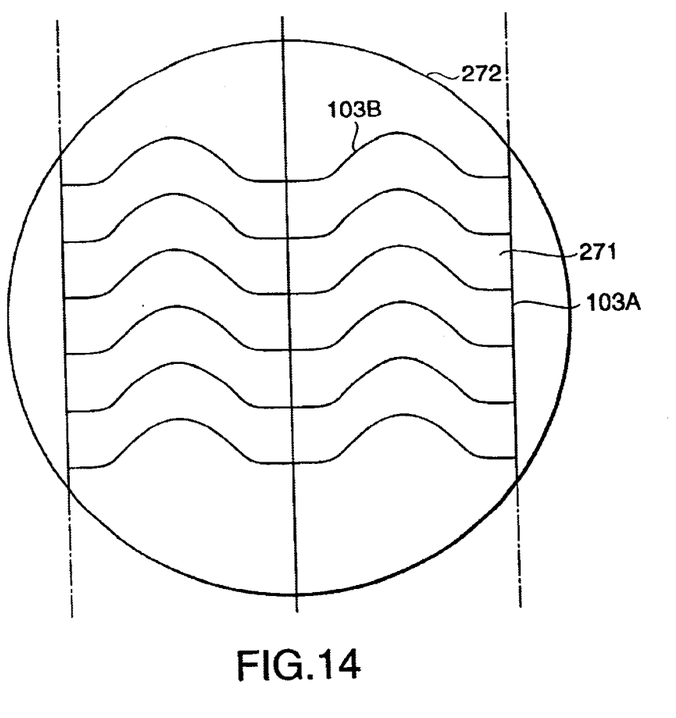
FIG. 14 is a layout view showing a wafer from which the silicon substrate having an arcuate shape is cut out.

A two-layer substrate structure also provides excellent resistance against impact and vibration. FIG. 13 shows an example of an arrayed waveguide grating having a two-layer substrate structure. An arrayed waveguide grating 207B is obtained by boding together the arrayed waveguide grating 207 shown in FIGS. 9 and 11 and a silicon substrate 271 of an arcuate shape having the same size and configuration as that of the silicon substrate 207 with adhesives (not shown in FIG. 13). FIG. 14 shows a wafer from which the silicon substrate having an arcuate shape is cut out. The same cutting paths 103A and 103B as those in the wafer 101 shown in FIG. 4 are scribed on a wafer 272. Since there is no need to provide the arrayed waveguide grating 207 shown in FIG. 4 on this wafer 272, a wafer having a purity level of silicon lower than that of the wafer 101 may be used as the wafer 272. Moreover, since the entire manufacturing process of the arrayed waveguide grating 207 itself is unnecessary, each arcuate-shaped silicon substrate 271 may be manufactured quite inexpensively. Therefore, the arrayed waveguide grating 207B having a two-layer substrate structure as shown in FIG. 13 may be manufactured at considerably less manufacturing cost as compared with the arrayed waveguide grating having a rectangular shape used in the prior art. In FIG. 13, instead of the arrayed waveguide grating 207B having the two-layer substrate structure, it is also possible to manufacture an arrayed waveguide grating having a multi-layer substrate structure by bonding together two or more arcuate-shaped silicon substrates 271. Further, the thickness of the wafer 272 from which the arcuate-shaped silicon substrates are cut out may be made sufficiently larger than that of the arrayed waveguide grating 207 to enhance its mechanical strength.

Figure 15:
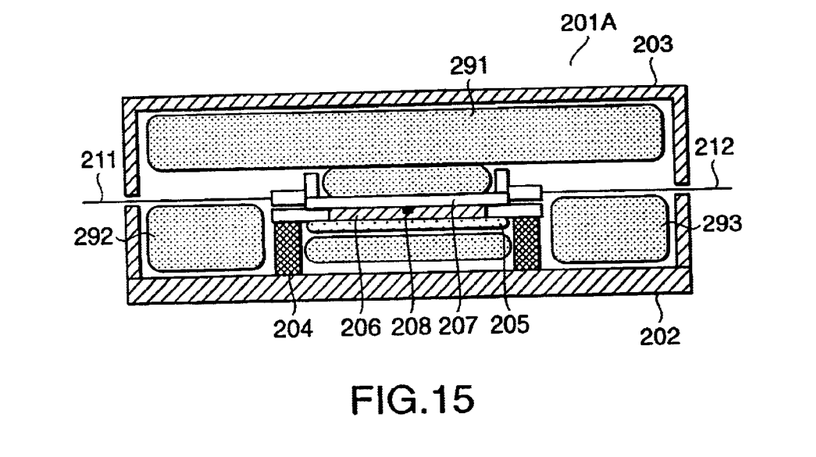
FIG. 15 is a cross-sectional view showing an exemplary interior structure of an array waveguide grating package for an arrayed waveguide grating of the buffer filling type.

Buffer filling also provides excellent resistance against impact and vibration. FIG. 15 shows an example of interior structure of an array waveguide grating package for an arrayed waveguide grating of a buffer filling type. In FIG. 15, the same or identical parts as those in FIG. 8 are represented by the same symbols, and explanation thereof is omitted here. As will be noted from comparison with FIG. 8, in the arrayed waveguide grating package 201A according to this modification, a first buffer and heat insulating agent 291 is filled in the space above the arrayed waveguide grating 207, a second buffer and heat insulating agent 292 is filled in the space below an optical fiber 211 defined by a heat insulating column 204 and a case cover 203, and a third buffer and heat insulating agent 293 is filled in the space below an optical fiber 212 defined by the other heat insulating column 204 and the case cover 203. These first to third buffer and heat insulating agents 291, 292 and 293 may be prepared by processing various materials having elasticity that have been used as insulating materials into appropriate forms.

Figure 16:
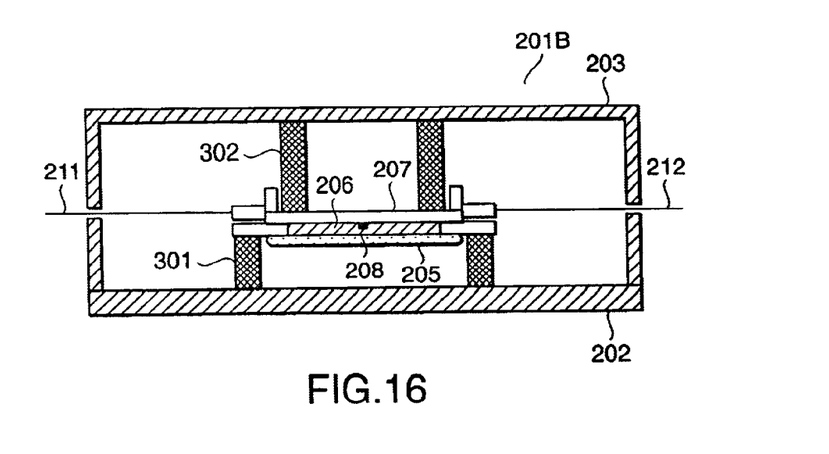
FIG. 16 is a cross-sectional view showing an exemplary interior structure of an arrayed waveguide grating package for an arrayed waveguide grating of the buffer filling type.

FIG. 16 shows another exemplary interior structure of an arrayed waveguide grating package for an arrayed waveguide grating with buffer filling material. In FIG. 16, the same or identical parts as those in FIG. 8 are represented by the same symbols, and explanation thereof is omitted here. In contrast to the arrayed waveguide grating package shown in FIG. 8, the arrayed waveguide grating package 201B is provided with a plurality of lower columns 301 made of spring material, instead of the heat insulating columns 204. Further, a plurality of upper columns 302 are also arranged between the upper surface of the arrayed waveguide grating 207 and the rear surface of the upper portion of the case cover 203. Preferably, these columns 301 and 302 have excellent insulating properties, in addition to excellent spring properties. Since the arrayed waveguide grating 207 is elastically supported by the upper and lower columns 301 and 302 in the arrayed waveguide grating package 201B, impact forces applied to the exterior of the package can be effectively absorbed. An elastic member for absorbing impact in a lateral direction may also be arranged on the case bottom plate portion 202 or the case cover 203.

The foregoing description is directed to an arrayed waveguide grating chip having an arcuate shape. Needless to say, however, the present invention can be applied to all types of chips having a non-rectangular profile or having a contour of a predetermined closed loop shape including a curved line at least in a part thereof.

Figure 17:
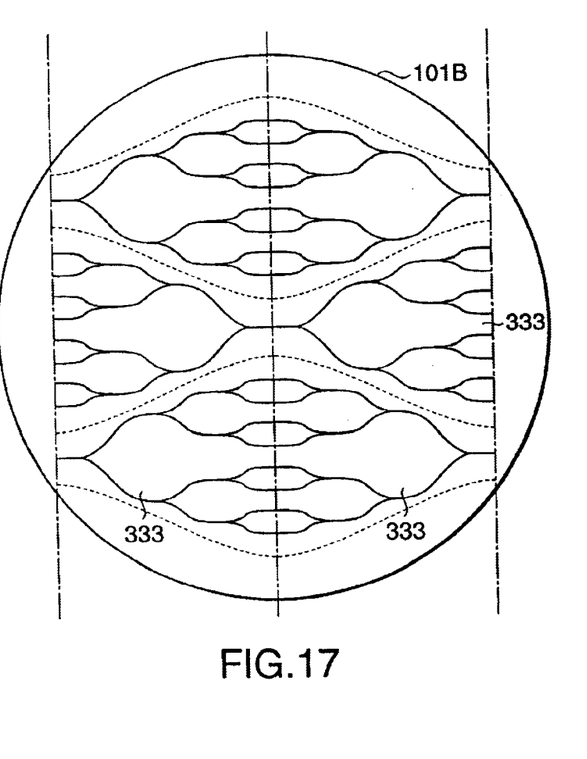
FIG. 17 is a layout view of 1×N splitters on a wafer.

FIG. 17 is a layout view of 1×N splitters on a wafer. The example given here is different from the above-described embodiments in that six 1×N splitters 333 each having a funnel shape obtained by dividing a rhombus in half are arranged on a wafer 101 B. In comparison with FIG. 3, three times more chips having the same shape and size can be obtained from one wafer 101B.

As described above, the present invention, the individual chips are not formed in a uniform rectangular shape as in the prior art, but are formed in a concave shape wherein unnecessary portions are removed. Consequently, the number of chips that can be obtained from one wafer is increased, thus allowing corresponding reduction in cost.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A chip comprising:
   a substrate; and
   an optical waveguide on said substrate,
   wherein said optical waveguide has a curved part, and said substrate includes a surface having a curvature that substantially follows the curved part of said optical waveguide.

2. The chip as claimed in claim 1, wherein said optical waveguide is an arrayed waveguide grating.

3. The chip as claimed in claim 2, wherein said side surface has a curvature that substantially follows the curved part of said arrayed waveguides of said arrayed waveguide grating.

4. The chip as claimed in claim 1, wherein said substrate is an arched shape.

5. The chip as claimed in claim 1, wherein said surface includes a convex side surface and a concave side surface opposing said convex side surface, and said convex side and said concave side have substantially the same curvature.

6. The chip as claimed in claim 1, said chip further comprising: reinforcement means mounted on at least a part of said chip.

7. The chip as claimed in claim 6, wherein said reinforcement means is mounted on a narrow portion of said chip.

8. The chip as claimed in claim 6, wherein said reinforcing means is a copper plate.

9. The chip according to claim 6, wherein said reinforcing means has a shape substantially similar to the shape of said chip.

10. The chip according to claim 6, wherein said reinforcing means is lager than said chip.

11. The chip as claimed in claim 1, further comprising: an another chip boned on the back of said chip.

12. The chip as claimed in claim 11, wherein said chip and said another chip are bonded by an adhesive.

13. A chip comprising:
    a substrate; and
    an optical waveguide on said substrate,
    wherein said optical waveguide has a curved part, and said substrate includes a side surface having a curvature that substantially follows the curved part of said optical waveguide.

14. The chip as claimed in claim 13, wherein said side surface includes a convex surface and a concave surface on opposing sides of the substrate, and the convex surface and the concave surface substantially follow the curved part of said optical waveguide.

15. The chip as claimed in claim 14, wherein said convex surface and said concave surface have substantially the same curvature.

16. The chip as claimed in claim 13, further comprising: an another chip bonded to the back of said chip.

17. The chip as claimed in claim 16, wherein said chip and said another chip are bonded by an adhesive.

18. A wafer comprising:
    a plurality of chips,
    wherein each said chip has an optical waveguide, and each said optical waveguide has a curved part, and an area of each said chip is delimited by a curved-line portion having a curvature that substantially follows the curved part of said optical waveguide of each said chip.

19. The wafer as claimed in claim 18, wherein each said chip is the same form.

20. The wafer as claimed in claim 18, wherein each said optical waveguide includes an arrayed waveguide grating.

21. The wafer as claimed in claim 18, wherein the shape of each chip is an arcuate shape having two curved-line portions curved in the same direction, said chips are arranged at a predetermined spacing, and respective end portions of said chips are connected to two mutually parallel straight lines.

22. The wafer of claim 18, wherein the shape of each chip is a funnel shape obtained by dividing in half a rhombus having two-curved-line portions convexed in a direction moving away from each another, and said chips are arranged at a predetermined spacing and respective end portions of said chips are connected to two mutually parallel straight lines.

23. A wafer comprising:

a plurality of chips, wherein each said chip has an optical waveguide, and each said optical waveguide has a curved part, and the boundary of each said chip includes a curved-line portion having a curvature that substantially follows the curved part of said optical waveguide of each said chip.

24. The wafer as claimed in claim 23, wherein each said chip is the same form.

25. The wafer as claimed in claim 23, wherein said each optical waveguide includes an arrayed waveguide grating.

26. The wafer as claimed in claim 23, wherein the shape of each chip is an arcuate shape having two curved-line portions curved in the same direction, and said chips are arranged at a predetermined spacing and respective end portions of said chips are connected to two mutually parallel straight lines.

27. The wafer of claim 23, wherein the shape of each chip is a funnel shape obtained by dividing in half a rhombus having two-curved-line portions convexed in a direction moving away from each another, and said chips are arranged at a predetermined spacing and respective end portions of said chips are connected to two mutually parallel straight lines.

28. A module comprising:

a chip including an optical waveguide;

fiber arrays connecting said chip;

a temperature control element for controlling the temperature of said chip;

a temperature detecting element for detecting the temperature of said chip; and a case for accommodating said chip, said fiber arrays, said temperature control element and said temperature detecting element, wherein said optical waveguide has a curved part, and said substrate includes a side surface having a curvature that substantially follows the curved part of said optical waveguide.

29. The module as claimed in claim 28, further comprising:

a support component inserted between said chip and said temperature control element.

30. The module as claimed in claim 29, wherein said support component is metal plate.

31. The module as claimed in claim 30, wherein said metal plate supports said chip.

32. The module as claimed in claim 31, wherein the metal plate is larger than the curved part of said optical waveguide.

33. The module as claimed in claim 29, further comprising heat insulating columns inserted between:

said support and said component, and said case.

34. The module as claimed in claim 28, wherein said temperature control element is heater.

* * * * *